United States Patent [19]
Allison et al.

[11] Patent Number: 5,131,943
[45] Date of Patent: Jul. 21, 1992

[54] PROCESS FOR THE SEPARATION OF PRECIOUS GROUP VIII A METALS FROM CYANO COMPLEXES OF SUCH METALS AND OTHER METALS

[75] Inventors: Joe D. Allison; James C. Thompsen, both of Ponca City, Okla.

[73] Assignee: Conoco Inc., Ponca City, Okla.

[21] Appl. No.: 626,117

[22] Filed: Dec. 11, 1990

[51] Int. Cl.$^5$ .............................................. C22B 3/24
[52] U.S. Cl. ......................................... 75/426; 75/722; 423/22; 423/DIG. 14
[58] Field of Search ................. 75/426, 427, 428, 722; 423/22, 25, 138, 24, 139, DIG. 14

[56] References Cited

U.S. PATENT DOCUMENTS

| Re. 30,066 | 8/1979 | Oberhofer | 210/684 |
| 3,817,745 | 6/1974 | Copes et al. | 75/426 |
| 3,994,719 | 11/1976 | Corte | 423/22 |
| 4,421,724 | 12/1983 | Hunnel | 423/22 |

Primary Examiner—Melvyn J. Andrews

[57] ABSTRACT

A mixture of cyanide complexes with certain Group VIII metals and other metals is passed in contact with solid subdivided cross-linked polyvinylpyrrolidone whereby the Group VIII metals—platinum, palladium, rhodium and iridium—are preferentially retained on the cross-linked polyvinylpyrrolidone. The retained metals are recovered by ashing or chemical treatment of the cross-linked polyvinylpyrrolidone.

17 Claims, 1 Drawing Sheet

PROCESS FOR THE SEPARATION OF PRECIOUS GROUP VIII A METALS FROM CYANO COMPLEXES OF SUCH METALS AND OTHER METALS

BACKGROUND OF THE INVENTION

In the leaching of ores, particularly of gold bearing ores, several desired metals, including gold, are extracted (leached) simultaneously using sodium cyanide as a leaching material Other metals which may be present in addition to gold are silver, palladium, platinum, cobalt, copper, iron and nickel. It is common practice to melt the metals in the leachates into a common precious metals bar which is then refined at a metals refinery. Leachates of gold ores may contain small amounts of platinum and palladium. The expense of recovering such small amounts of these materials from the precious metals bar is very high.

It would be desirable to have a process in which the leachates could be treated to preferentially remove platinum and palladium. Such a process would be particularly advantageous where the platinum and palladium content of the leachates is very small compared to the gold content.

PRIOR ART

Reissue U.S. Pat. No. 30066 to Oberhofer discloses a process for the removal of chromate ions from waste water containing high levels of dissolved solids using an ion exchange resin in macro porous form. The preferred resins are described as the polystyrene divinylbenzene amines. Amine derivatives of polyvinylpyrrolidone are mentioned as an alternative resin which is suitable for use.

U.S. Pat. No. 3,994,719 to Corta et al. discloses the use of cross-linked macroporous vinylaromatic synthetic resins containing thiouria groups for absorbing metal compounds from a liquid medium. Vinylpyrrolidone is described as one of the vinyl compounds suitable for use in the process.

THE INVENTION

In the process of the invention, a mixture of metal cyanide complexes in which the metals include Group VIII A metals selected from the group consisting of platinum, palladium, rhodium and iridium and other metal complexes is passed in contact with subdivided solid cross-linked polyvinylpyrrolidone whereby the aforesaid Group VIII A metals are preferentially retained on the cross-linked polyvinylpyrrolidone. The retained metals are recovered from the cross-linked polyvinylpyrrolidone by ashing the polyvinylpyrrolidone or by suitable chemical treatment of the polyvinylpyrrolidone.

DETAILED DESCRIPTION OF THE INVENTION

Figure 1:
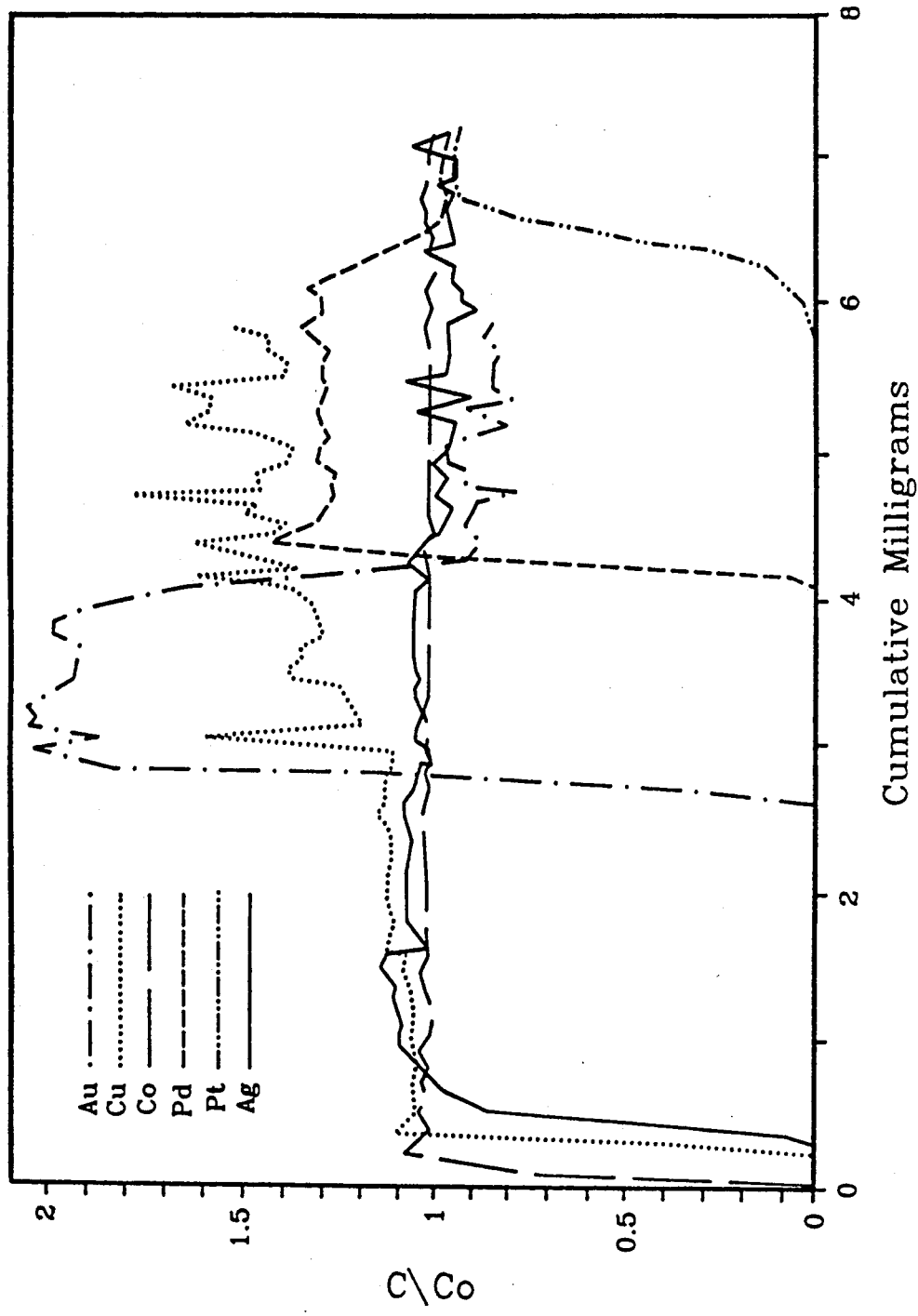
FIG. 1 is a graph showing the breakthrough of various metal cyanide complexes from a column containing cross-linked polyvinylpyrrolidone.

The process of the invention is particularly applicable to the treatment of cyanide leachates obtained from gold mining operations. The leachates are obtained by contacting ore which has been subdivided by grinding with a dilute aqueous solution of sodium cyanide. The metals in the ore which may include silver, cobalt, copper, nickel and iron, in addition to gold, platinum and palladium react with the sodium cyanide to form complexes. Illustrative of these complexes are $Pt(CN)_4^=$, $Pd(CN)_4^=$, $Au(CN)_2^-$, and $Ag(CN)_2^-$. The pH of the sodium cyanide leaching solution is preferably maintained alkaline by the addition of sodium hydroxide, usually greater than 10.5, to prevent evolution of hydrogen cyanide.

Usually the gold content of gold ores is rather small. However, frequently the amount of gold contained in the ore is many times greater than the platinum or palladium content. Conventional metal recovery processes for recovering platinum and palladium metals from gold are expensive and are particularly uneconomical when the amount of gold present in the metals is much greater than the amount of platinum or palladium.

In carrying out the process of the invention, gold mining aqueous leachate containing cyanide complexes of gold, platinum and various other metals, such as palladium, silver, cobalt, copper and iron, is passed in contact with subdivided cross-linked polyvinylpyrrolidone. As this contact occurs, the metal complexes in the aqueous leachates are adsorbed on the surface of the cross-linked polyvinylpyrrolidone. Some of the metal complexes are more strongly adsorbed by the polyvinylpyrrolidone than others. Thus, as contact of the leachate with polyvinylpyrrolidone continues, varying amounts of each of the metal complexes are adsorbed. When the amount of a particular metal complex reaches its maximum adsorption on the polyvinylpyrrolidone, the adsorption of this particular complex ceases, and the flowing leachate after this point retains all of this metal complex. When the concentration of each metal complex retained on the cross-linked polyvinylpyrrolidone is determined, it is found that the material least adsorbed is gold, and the material having the highest degree of adsorption is platinum, with the other metals following in increasing order from gold, viz, cobalt, iron, copper, silver and palladium. Usually contact of the leachate containing the metal complexes with the cross-linked polyvinylpyrrolidone is continued until the polyvinylpyrrolidone is saturated with the platinum complex whereby approximately all of the platinum complex contained in the leachate has been removed. If the amount of platinum removed at that point is assigned an arbitrary value of 100, the amount of gold complex retained on the cross-linked polyvinylpyrrolidone will range from about 0.5 to about 1.0, thus the amount of platinum removed from the leachate is 100 to 200 times the amount of gold removed.

The second most preferentially adsorbed complex is the palladium complex with a removal of about 60 to about 70 parts based on 100 parts of platinum. The other metal complexes are removed in lesser amounts, i.e. silver from 10 to 12 parts, copper from 6 to 7.5 parts, iron from 4 to 5 parts, and cobalt from 2 to 3 parts.

The point at which each metal complex ceases to be adsorbed on the column and thus continues to pass through the column at its original concentration in the leachate may readily be determined by periodically sampling the effluent leachate from the cross-linked polyvinylpyrrolidone and analyzing the samples via ion chromatography or by any other suitable method.

Polyvinylpyrrolidone is prepared by the polymerization of N-vinyl-2-pyrrolidone. The polymerization may be carried out in bulk, in solution or in suspension and may be catalyzed cationically with BF3, anionically with potassium amide, or with free radical initiators such as hydrogen peroxide, benzoyl peroxide or azobisisobutyronitrile.

Typical polymerization recipes employing a variety of free radical techniques are described in German Patent 2439187 which is hereby incorporated by reference.

Polyvinylpyrrolidone is soluble in water and must be cross-linked in order to render it water insoluble for use in the process of the invention. It is usually cross-linked by the use of diallyl compounds, i.e. diallyl or diallyl amine. Cross-linking is carried in the presence of an initiator such as azobisisobutyronitrile utilizing various amounts of diallyl or diallyl amine. Cross-linking of polyvinyl pyrrolidone may also be effected by heating the material in air at 150° C. or by mixing with peroxydisulfate and heating at 90° C. for 30 minutes. This procedure is disclosed in U.S. Pat. No. 2,658,045 which is hereby incorporated by reference. Cross-linked polyvinylpyrrolidone is sold under a number of names including polyvinylpolypyrrolidone, Kollidon CL (BASF), Polyclar (GAF), and crospovidone. Commercial grades of the cross-linked polymer may be obtained from BASF, GAF and other companies.

In carrying out the process of the invention, the polymer is suitably disposed in a column or vessel in a subdivided form to provide a large surface for contact with leachate containing the metal cyanide complexes. Any size solids or any type or shape solids may be used effectively in the process. The amount of cross-linked polyvinylpyrrolidone used in carrying out the process will depend on the concentration of the various metals in the leachate and the surface area of the cross-linked polyvinylpyrrolidone. When processing leachate from a gold mining operation usually from about 0.001 to about 0.1 volumes of cross-linked polyvinylpyrrolidone will be sufficient per volume of leachate.

In leaching the ore, a solution of sodium cyanide is used, usually having a concentration between about 0.005 to about 2.0 molar. With gold ores the cyanide leaching solution is very dilute, usually 0.04 molar or less.

The leachate containing the cyanide metal complexes may be passed in contact with the cross-linked polyvinylpyrrolidone either in an up flow or down flow arrangement. In order to provide for a continuous operation, several columns or vessels containing the cross-linked polyvinylpyrrolidone may be used in parallel so that recovery of adsorbed metals from one or more columns or beds may be effected without interrupting flow of the leachate to the process.

The adsorbed metal complexes may be recovered from the cross-linked polyvinylpyrrolidone by ashing the polymer. This may be effected in a suitable furnace or other type of heater with the melted metals readily being separated from the polyvinylpyrrolidone ash. Recovery of the metals from the cross-linked polyvinylpyrrolidone may also be effected by chemical means; for example, by washing the polyvinylpyrrolidone with acids or other suitable chemicals.

The invention has been described in its particular application to recovery of platinum from leachates of gold ores. While palladium is not as strongly adsorbed on the cross-linked polyvinylpyrrolidone as platinum, it is more strongly held than gold or silver or the other metals present in gold ore leachate. Thus, concentration or removal of palladium is also effected in the process of the invention. While the invention is particularly applicable to the processing of leachates from gold ores, it may be used in any situation in which platinum or palladium are present in combination with other metals, and particularly where platinum and palladium or other Group III metals are present in small amounts. An example is the automobile catalytic muffler which contains platinum as the catalytic agent. Such mufflers also contain very small amounts of rhodium. The process of the invention would be particularly applicable to the recovery of this latter very valuable material.

The following example is presented in illustration of the process of the invention.

EXAMPLE

A column containing 6 grams of cross-linked polyvinylpyrrolidone powder was made up in a glass buret. A solution containing 20 milligrams per liter of cyanide complexes of gold, silver, copper, cobalt, iron, palladium and platinum was passed through the column continuously. Samples of the effluent from the column were analyzed via ion chromatography to determine the concentration of the various metal complexes on the polyvinylpyrrolidone.

FIG. 1 is a graph which shows the breakthrough of the various cyanide metal complexes. The breakthrough is represented in the FIGURE as the concentration C of the effluent divided by the concentration $C_0$ in the solution introduced to the buret. This ratio equals 1 when the concentration C of the effluent is equal to the concentration $C_0$ of the entering solution. The concentration ratio is plotted versus the total number of micrograms of the metals passed through the column. It is noted from FIG. 1 that cobalt is the first material to break through the column, followed quickly by copper and silver. At about 2.3 cumulative milligrams the gold breaks through, and at 4 milligrams the palladium breaks through. It is noted that platinum at 6 milligrams is the last metal complex to break through the column.

The test was stopped when platinum began to break through the column. At this point 0.30 liters of the solution containing 6.0 milligrams of platinum complex had been passed through the column. A final analysis of the column material is set forth in Table 1.

TABLE 1

| Metal | Micro Grams of Metal/Gram of Cross-Linked Polyvinylpyrrolidone |
|---|---|
| Au | 7 |
| Co | 24 |
| Fe | 44 |
| Cu | 68 |
| Ag | 110 |
| Pd | 650 |
| Pt | 1000 |

It should be noted that the column at the end of the test was highly concentrated in platinum. It is further noted that essentially 100 percent of the platinum in the solution entering the column was adsorbed and removed by the cross-linked polyvinylpyrrolidone.

While certain embodiments and details have been shown for the purpose of illustrating the present invention, it will be apparent to those skilled in the art that various changes and modifications may be made herein without departing from the spirit or scope of the invention.

We claim:

1. A process for separating Group VIII A metals selected from the group consisting of platinum, palladium, rhodium and iridium from a mixture of the metal cyanide complexes of such metals and other metals which comprises passing said mixture in contact with solid polyvinylpyrrolidone which is cross-linked with a diallyl compound, whereby said metal complexes of said selected Group VIII A metals are preferentially retained on the cross-linked polyvinylpyrrolidone.

2. The process of claim 1 in which the metal complexes preferentially retained on the cross-linked polyvinylpyrrolidone are the platinum and palladium complexes.

3. The process of claim 1 in which the metal complex preferentially retained on the cross-linked polyvinylpyrrolidone is the platinum complex.

4. A process for separating Group VIII A metals selected from the group consisting of platinum, palladium, rhodium and iridium from a mixture of the metal cyanide complexes of such metals and other metals which comprises passing said mixture in contact with solid polyvinylpyrrolidone which is cross-linked with a diallyl compound, whereby said metal complexes of said selected Group VIII A metals are preferentially retained on the cross-linked polyvinylpyrrolidone and recovering the retained metals.

5. The process of claim 4 in which the metal complexes preferentially retained on the cross-linked polyvinylpyrrolidone are the platinum and palladium complexes.

6. The process of claim 4 in which the metal complex preferentially retained on the cross-linked polyvinylpyrrolidone is the platinum complex.

7. A process for separating platinum and palladium cyanide complexes from a mixture with cyanide complexes of other metals including gold which comprises passing said mixture in contact with solid subdivided polyvinylpyrrolidone which is cross-linked with a diallyl compound, whereby said platinum and palladium complexes are preferentially retained on the cross-linked polyvinylpyrrolidone.

8. The process of claim 7 in which the metal complex preferentially retained on the cross-linked polyvinylpyrrolidone is the platinum complex.

9. A process for separating platinum and palladium complexes from a mixture of cyanide complexes of other metals selected from the group consisting of gold, silver, cobalt, copper, iron and nickel which comprises passing said mixture in contact with solid subdivided polyvinylpyrrolidone which is cross-linked with a diallyl compound, whereby said platinum and palladium complexes are preferentially retained on the cross-linked polyvinylpyrrolidone and recovering the retained platinum and palladium.

10. The process of claim 9 in which the metal complex most preferentially retained on the cross-linked polyvinylpyrrolidone is the platinum complex.

11. The process according to claim 1, wherein the diallyl compound is diallyl amine.

12. The process according to claim 4, wherein the diallyl compound is diallyl amine.

13. The process according to claim 7, wherein the diallyl compound is diallyl amine.

14. The process according to claim 9, wherein the diallyl compound is diallyl amine.

15. A process for separating platinum and palladium from other Group VIII metals contained in an ore which comprises:
   (a) contacting an ore containing Group VIII metals with a leachate comprising a solution of sodium cyanide at from about 0.005 to about 2.0 molar and at a pH of 10.5 or greater to produce metal cyanide complexes,
   (b) contacting metal cyanide complexes produced in step (a) above with solid polyvinylpyrrolidone which is cross-linked with a diallyl compound thereby platinum and palladium are preferentially retained on the cross-linked polyvinylpyrrolidone; and
   (c) recovering platinum and palladium metals from the cross-linked polyvinylpyrrolidone of step (b).

16. The process according to claim 15, wherein the Group VIII metal of step (a) is a member selected from the group consisting of platinum, palladium, gold, silver, cobalt, copper or iron and mixtures thereof.

17. The process according to claim 15, wherein the diallyl compound is diallyl amine.

* * * * *

UNITED STATES PATENT AND TRADEMARK OFFICE
CERTIFICATE OF CORRECTION

PATENT NO. : 5,131,943

DATED : July 21, 1992

INVENTOR(S) : Joe D. Allison and James C. Thompsen

It is certified that error appears in the above-identified patent and that said Letters Patent is hereby corrected as shown below:

Column 6, line 36, Claim 15, "thereby" should read --whereby--.

Signed and Sealed this

Tenth Day of August, 1993

Attest:

MICHAEL K. KIRK

*Attesting Officer*     Acting Commissioner of Patents and Trademarks